(12) United States Patent
Miyaji

(10) Patent No.: US 7,372,637 B2
(45) Date of Patent: May 13, 2008

(54) FOCUSING UNIT AND OPTICAL DEVICE

(75) Inventor: Kazuya Miyaji, Saitama (JP)

(73) Assignee: Kamakura Koki Co., Ltd., Saitama (JP)

( * ) Notice: Subject to any disclaimer, the term of this patent is extended or adjusted under 35 U.S.C. 154(b) by 0 days.

(21) Appl. No.: 11/618,588

(22) Filed: Dec. 29, 2006

(65) Prior Publication Data

US 2007/0183059 A1 Aug. 9, 2007

(30) Foreign Application Priority Data

Feb. 8, 2006 (JP) ............................. 2006-031399

(51) Int. Cl.
*G02B 15/14* (2006.01)
*G03B 3/00* (2006.01)
*G03B 17/00* (2006.01)

(52) U.S. Cl. .................... 359/699; 353/101; 396/79

(58) Field of Classification Search ............... 359/694, 359/696, 699, 700–701, 704; 396/79, 83; 353/101; 350/429, 521–522, 530, 556
See application file for complete search history.

(56) References Cited

U.S. PATENT DOCUMENTS

| | | | | |
|---|---|---|---|---|
| 3,540,792 A * | 11/1970 | Akin, Jr. | ...................... | 359/414 |
| 4,053,211 A | 10/1977 | Momiyama | | |
| 4,436,387 A * | 3/1984 | Shimizu | ...................... | 359/418 |
| 4,545,656 A | 10/1985 | Takano | | |
| 4,630,901 A | 12/1986 | Altenheiner et al. | | |
| 5,103,248 A * | 4/1992 | Sato | ............................ | 359/414 |
| 5,999,312 A * | 12/1999 | Funatsu | ...................... | 359/407 |
| 6,429,969 B1 * | 8/2002 | Koide et al. | ................. | 359/413 |
| 6,580,555 B2 * | 6/2003 | Crista | ......................... | 359/426 |

OTHER PUBLICATIONS

EPO Search Report Dated Apr. 7, 2007, for Corresponding EP0 Application No. EP6127023.7.

* cited by examiner

*Primary Examiner*—Scott J. Sugarman
*Assistant Examiner*—DaWayne A Pinkney
(74) *Attorney, Agent, or Firm*—The Maxham Firm

(57) ABSTRACT

A focusing mechanism allowing a user to adjust the focus from infinity to a close distance rapidly and precisely, and an optical device utilizing such a focusing mechanism. The focusing unit includes an optical member movable along an optical axis of an optical system, a screw body put into rotation via the rotation of an operation member, a nut body meshing with the screw body and including a cam follower, a cam follower restricting means including a rotation restricting portion for restricting the cam follower from rotating or revolving about a rotation or revolution axis of the operation member, and a rotation restriction releasing portion for releasing the restriction which prevents the rotation or revolution of the cam follower about the rotation or revolution axis of the operation member, and an optical member moving means for moving the optical member along the optical axis via the movement of the nut body along its rotation axis.

19 Claims, 4 Drawing Sheets

FOCUSING UNIT AND OPTICAL DEVICE

FIELD OF THE INVENTION

The present invention relates to a focusing unit and an optical device, more specifically to a focusing unit which allows the precise focusing from infinity to a close distance, and to an optical device incorporating the focusing unit which is capable of precisely focusing from infinity to a close distance.

DISCUSSION OF PRIOR ART

Optical devices such as binoculars are required to provide a focusing function allowing an observer to instantly adjust its focus from infinity to a close distance. On the other hand, the optical devices are also required to provide a function enabling the precise focusing operation particularly when an object lying at or around infinity must be observed, which is the operation frequently undertaken in connection with such optical devices.

With regard to common optical devices such as binoculars and monoculars, for example, field scopes, focusing is achieved by moving a lens or a part of an optical system at large, including a lens, along an optical axis using a helicoid mechanism. Incidentally, the helicoid mechanism is a mechanism for adjusting the focus comprising, for example, a body having a screw and an operation knob and a body having a screw nut and combined with the body having screw wherein rotation of the operation knob causes the body having a screw nut to move in a direction in parallel with an optical axis, which in turn causes the movement of a focusing lens.

However, with the helicoid mechanism described above, movement of the lens is limited to a certain fixed rate with respect to rotation of the operation knob over the entire range of focusing. For illustration, take a focusing unit incorporating a helicoid mechanism where the lead, that is, the distance which a focusing lens moves in a direction in parallel with an optical axis for each turn of the operation knob, is comparatively long. It is comparatively easy for the focusing unit to instantly adjust the focus over the entire focusing range by rotating the operation knob at a small angle, while it is comparatively difficult to precisely adjust the focus. On the other hand, with another focusing unit incorporating a helicoid mechanism where the lead is comparatively short, it is comparatively easy for the focusing unit to precisely adjust the focus, while focusing over the entire focusing range is comparatively difficult because, to achieve this, the operation knob must be turned many times which impedes the rapidity of focusing operation and also complicates the operation.

SUMMARY OF THE INVENTION

A purpose of the invention is to provide a focusing mechanism which allows the rapid and precise focusing from infinity to a close distance, and an optical device incorporating such a focusing mechanism.

As means to meet the above purpose, an embodiment of the invention provides a focusing unit comprising an optical member movable along an optical axis of an optical system, a screw body put into rotation via the rotation of an operation member, a nut body meshing with the screw body and including a cam follower, a cam follower restricting means including a rotation restricting portion for restricting the cam follower from rotating or revolving about a rotation or revolution axis of the operation member, and a rotation restriction releasing portion for releasing the restriction which prevents the rotation or revolution of the cam follower about the rotation or revolution axis of the operation member, and an optical member moving means for moving the optical member along the optical axis via the movement of the nut body along its rotation axis.

Another aspect of the invention provides a focusing unit together with the above embodiment wherein the optical member is an objective lens, an eyepiece lens, or a prism arranged on an optical axis between the objective lens and eyepiece lens.

A further aspect of the invention provides a focusing unit together with the initial embodiment wherein the nut body comprises a cylindrical body having a female thread meshing with a male thread of the screw body, and a cam follower, and wherein the cam follower is a pin protruding through the outer peripheral surface of the cylindrical body in a radial direction with the rotation axis of the nut body as the center.

Still another aspect of the invention is a focusing unit wherein the rotation restricting portion is a first long groove which is formed, in parallel with the central axis of the fixed cylindrical body, on the peripheral surface of the fixed cylindrical body capable of receiving insertion of the nut body, so that the groove can receive insertion of the pin, and wherein the rotation restriction releasing portion is a second long groove which is formed on the peripheral surface of the fixed cylindrical body such that the groove is continuous with the above rotation restricting portion, is not in parallel with the central axis of the fixed cylindrical body, and can receive insertion of the pin.

Yet another aspect of the invention is a focusing unit wherein the optical member moving means is a rod body attaching a holding member for holding the optical member to the nut body.

Another aspect of the invention is an optical device according to the invention and incorporating a focusing unit.

According to the focusing unit of an embodiment of the invention, the screw body is put into rotation via rotation of the operation member. Under the condition where the cam follower of the nut body meshing with the screw body is restricted by the rotation restricting portion, the nut body meshing with the screw body cannot rotate, and moves along the rotation axis. As the nut body advances along the rotation axis, the movement of the nut body along the rotation axis causes the optical member, such as an objective lens, eyepiece lens, or a prism inserted between an objective lens and eyepiece lens, to move in a direction in parallel with an optical axis. The optical member moves in a direction in parallel with the rotation axis by an amount corresponding to the rotation amount of screw body driven via rotation of the operation member. Thus, it is possible to rapidly move the focus from a close distance to infinity and from infinity to a close distance.

Next, consider a situation where focusing at a close distance or at infinity is required. Under this situation, the cam follower moves out of the rotation restricting portion to enter into the rotation restriction releasing portion. Therefore, when the operation member is rotated, since the cam follower is in the rotation restriction releasing portion where rotation of the nut body about its rotation axis is no longer restricted, the nut body is allowed to rotate about its rotation axis in response to rotation of the screw body while the nut body moves in parallel with the rotation axis. The distance the nut body moves in parallel with the rotation axis with respect to rotation of the screw body is far smaller than the corresponding distance the nut body moves in parallel with the rotation axis when the cam follower is restricted by the rotation restricting portion. In other words, the axial movement of the optical member with respect to rotation of the operation knob is so attenuated that it is possible to adjust the focus finely and precisely.

Consequently, according to embodiments of the invention, it is possible to rapidly move the focus from a close distance to infinity, or from infinity to a close distance, and thus provided is a focusing unit whereby it is possible to adjust the focus at a close distance or at infinity finely and precisely.

Furthermore, according to embodiments of the invention, an optical device is provided which makes it possible, by incorporating a focusing unit of the invention, to rapidly move the focus from an object at a close distance to another at infinity, and to adjust the focus finely and precisely.

DETAILED DESCRIPTION OF THE PREFERRED EMBODIMENTS

A focusing unit representing an embodiment of the invention and a binocular representing an optical device incorporating such a focusing unit will be described with reference to the attached drawing figures.

Figure 1:
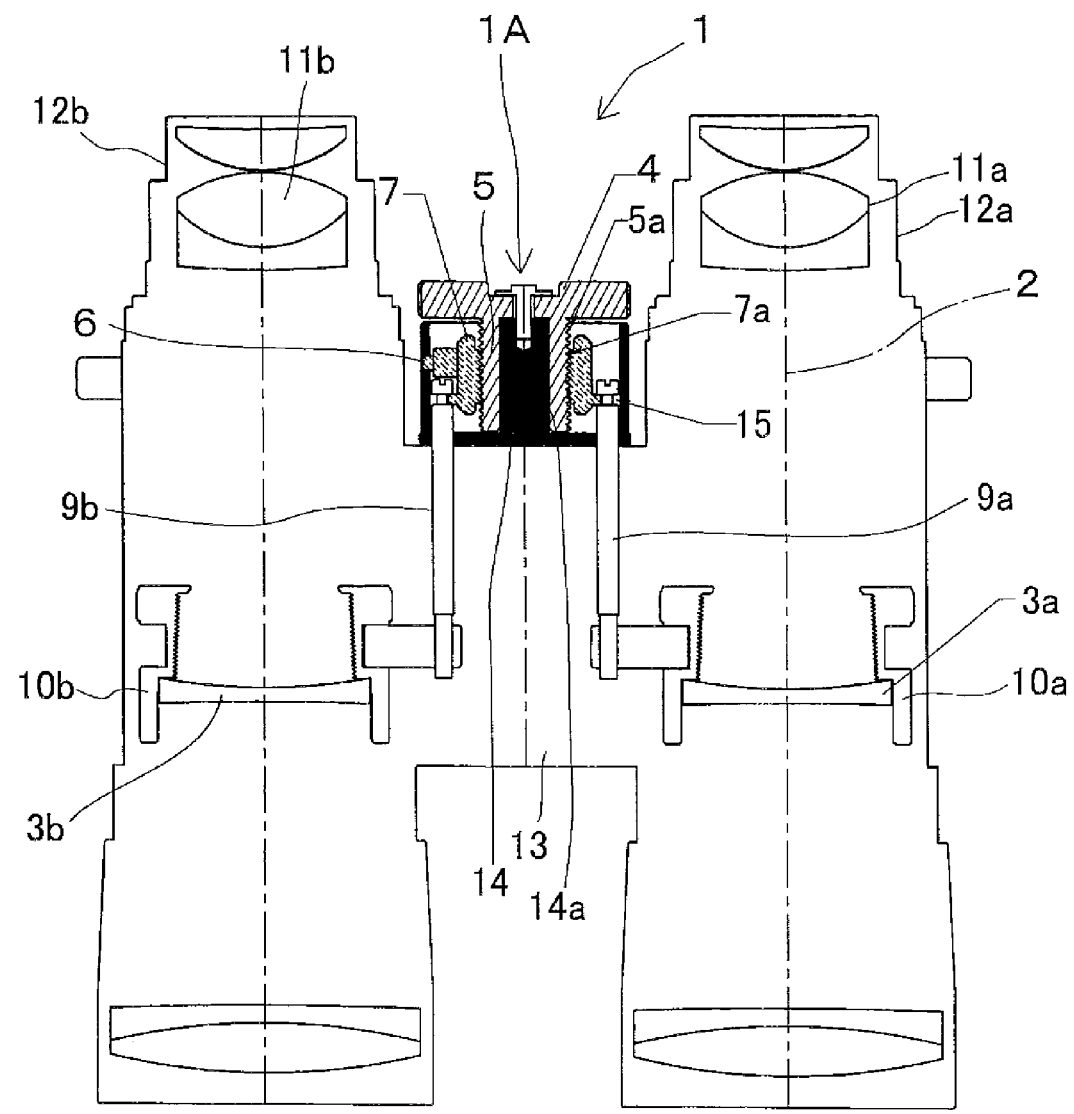
FIG. 1 is an illustration showing a binocular representing an exemplary optical device of the invention incorporating a focusing unit representing an embodiment of the invention.
Figure 2:
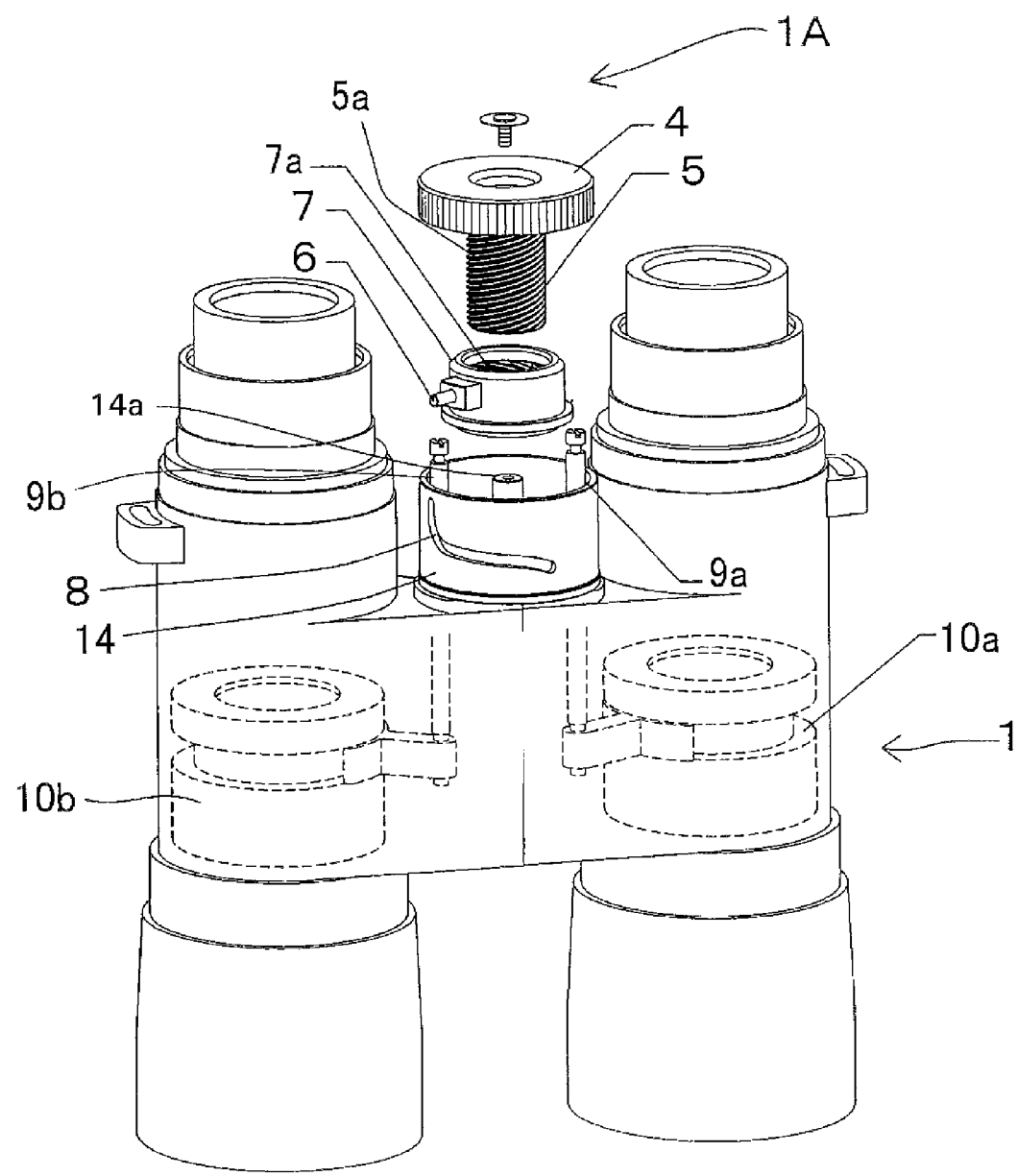
FIG. 2 is a partially exploded illustration showing the binocular representing an exemplary optical device of the invention incorporating a focusing unit representing an embodiment of the invention.

As shown in FIGS. 1 and 2, a binocular I has a focusing unit IA. The focusing unit 1A comprises an optical member, for example, an objective lens 3a movable along an optical axis 2; a screw body 5 having screw threads and capable of rotating via the rotation of an operation knob 4; a nut body 7 meshing with the screw body 5 and including a cam follower 6; a cam groove 8 representing an embodiment of a cam follower restricting means comprising a rotation restricting portion for restricting the rotation or revolution of the cam follower 6 about the rotation or revolution axis of operation knob 4, and a rotation restriction releasing portion for releasing the restriction imposed on the rotation of the cam follower 6 about the optical axis; and a rod body 9a representing an embodiment of a lens moving means for moving the objective lens 3a along the optical axis via the movement of the nut body 7 in parallel with the rotation axis.

In this particular embodiment, the objective lens 3a is a single objective lens. The objective lens 3a is fixed to the interior of an inner cylindrical body 10a.

With the binocular 1, an eyepiece lens 11a is arranged on the optical axis of lens 3, and the inner cylindrical body 10a incorporating objective lens 3a, and the eyepiece lens 11a are housed in a right ocular cylinder 12a. The binocular 1 further includes a left ocular cylinder 12b which has the same structure as that of right ocular cylinder 12a. Namely, the left ocular cylinder 12b has, in its interior, an inner cylindrical body 10b incorporating an objective lens 3b, and an eyepiece lens 11b arranged along an optical axis 2. Both of the inner cylindrical body 10a within right ocular cylinder 12a and the inner cylindrical body 10b within left ocular cylinder 12b are constructed such that they can advance or retreat along their respective optical axes in the right and left ocular cylinders 12a and 12b, which brings about the movement of objective lens 3b thereby achieving adjustment of the focus.

The right and left ocular cylinders 12a, 12b are connected to each other via a rotatable connecting portion 13 such that the interval between the optical axes of the right and left ocular optical systems can be adjusted in accordance with the inter-pupil distance of a user, that is, the distance between the right and left pupils of a person who is going to use the binocular.

Figure 3:
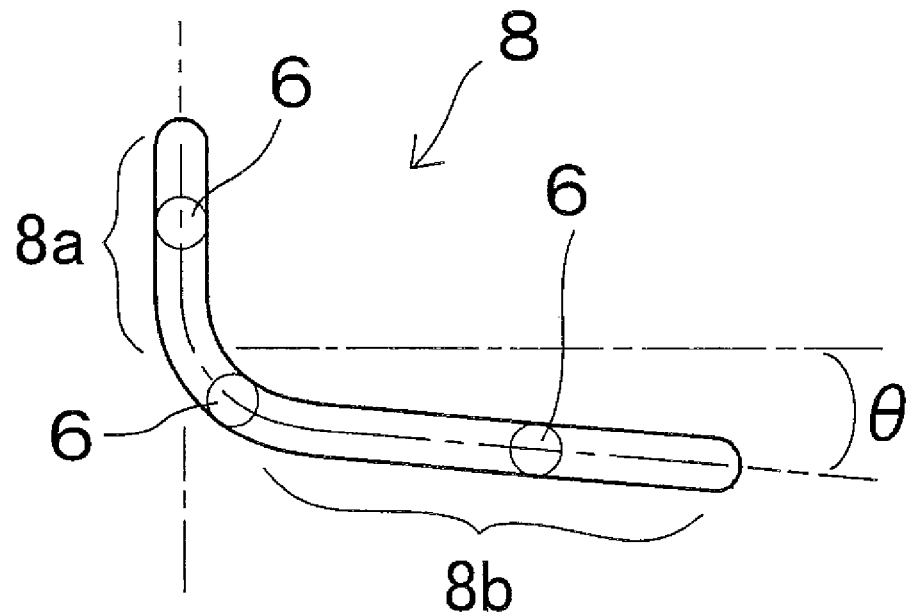
FIG. 3 is an illustration showing a cam groove of the focusing unit according to the invention.

The operation knob 4 is mounted to a cam ring 14 fixed to the rotatable connecting portion 13 between the right and left ocular cylinders 12a, 12b. As shown in detail in FIG. 2, the cam ring 14 has a joining pin 14a which stands at the center of the bottom of a one end closed cylindrical body and extends toward the open end of the cylindrical body. On the peripheral surface of the one end-closed cylindrical body there is inscribed a cam groove 8 as shown in FIGS. 2 and 3 which serves as a cam follower restricting means. The cam ring 14 is a fixed cylindrical body capable of receiving the insertion of the nut body 7 and fixed to the rotatable connecting portion 13.

The operation knob 4 is a disc body having a disc-like shape, and on one surface of the disc body there stands a screw body 5 which has a male thread on its surface and is columnar. The operation knob 4 is fixed to the cam ring 14 by receiving the joining pin 14a of the cam ring 14 in a joining cavity formed from the tip end of the screw body 5. The screw body 5 has been designed to have a length from its tip end to the operation knob 4 that allows the tip end of the screw body 5 to reach the bottom of cam ring 14.

To the screw body 5 is joined the nut body 7 by meshing with a female thread 7a formed on the inner peripheral surface of the nut body 7 having a cylindrical shape, with the male thread 5a formed on the outer peripheral surface of the screw body 5.

The nut body 7 includes a cam follower 6 in the form of a pin protruding beyond the outer peripheral surface of the nut body 7, and two rod body attachment portions 15 to which rod bodies 9a, and 9b are attached.

On the other hand, the cam groove 8 inscribed on the outer peripheral surface of cam ring 14 has a long opening 8a and a second long opening 8b as shown in FIG. 3. The long opening 8a is an embodiment representing a revolution restricting portion for restricting the rotation of the joining pin 14a about the axis of the screw body 5, and is a long opening formed generally parallel with the above line of axis. The axial length of the long opening 8a may be determined as appropriate depending on the type and size of the optical device. The width of long opening 8a, that is, the width of long opening 8a measured in a direction perpendicular to the line of axis which is responsible for determination of the axial length of long opening 8a may be determined as appropriate, provided that the width can receive the insertion of cam follower 6 without any looseness.

The aforementioned second long opening 8b is an embodiment representing a revolution restriction releasing member for releasing the restriction imposed on the revolution of cam follower 6. This is continuous with the long opening 8a and is a thin slit having a slope with respect to a direction perpendicular to the axis line of the screw body 5 with a specified angle θ. The aforementioned specified angle θ is determined by taking the axis line of cam ring 14 which is parallel with the optical axis, and the axis line of long opening 8a, connecting the two axis lines to form a radial line, depicting a projection plane in a direction perpendicular to the radial line, projecting the second long opening 8b onto the projection plane to depict a projection axis line of second long opening 8b there, and measuring the angle formed between the projection axis line and an imaginary radial line including the axis line projected onto the projection plane. The angle θ may be determined as appropriate depending on size of the binocular and position of the focus to be finely adjusted. However, the angle θ is normally in the range of 0 to 90 degrees, preferably about 3 to 45 degrees.

To two rod body attachment portions 15 in the cam ring 14 are attached to one end of each two rod bodies 9a, 9b, and the other end of rod body 9a is attached to the inner cylindrical body 10a while the other end of rod body 9b is attached to the inner cylindrical body 10b. Incidentally, in this particular embodiment, the rod bodies 9a, 9b pass through respective throughholes formed on the bottom of cam ring 14.

The focusing unit of the invention performs operations as described below.

Let's assume that at an initial state, the cam follower 6 is positioned at an end of first long opening 8a continuous with second long opening 8b. When the operation knob 4 is revolved, the screw body 5 is put into rotation. Since the cam follower 6 is restricted by the first long opening 8a not to rotate, the nut body 7 can not rotate either. Thus, via the rotation of the screw body 5, the nut body 7 moves in a direction in parallel with the axis line of screw body 5. The distance the screw body 5 moves in a direction in parallel with the aforementioned axis line is determined by the number of turns the screw body 5 takes during its rotation. The movement of the screw body 5 is transmitted via rod bodies 9a, 9b to put the objective lens 3a, 3b away from eyepiece lens 11a, 11b. Through this series of actions, it is possible to rapidly shift the focus converged onto an observation image close at hand through eyepiece lens 11a, 11b by an observer to an observation image at infinity.

As the nut body 7 advances, the cam follower 6 travels along the long opening 8a to reach the second long opening 8b. Since the cam follower 6 entering into the second long opening 8b is released from the restriction which has prevented the screw body 5 from revolving about its central axis, the nut body 7 revolves about the axis of the screw body 5 as the revolution center via the rotation of the screw body 5, and at the same time, moves in a direction parallel with the axis line of the screw body 5 depending on the sloping angle θ of second long opening 8b. The distance the nut body 7 moves along the axis line with the cam follower 6 being restricted by the second long opening 8b is comparatively small with respect to the rotation amount of operation knob 4. Accordingly, the movement of objective lens 3a, 3b driven by the axial movement of the nut body 7 is also attenuated. Through this arrangement, it is possible to finely adjust the focus so as to allow an observer to clearly view an observation image at infinity.

The cam follower restricting means is not limited to a cam groove 8 comprising a long opening 8a and a second long opening 8b. The cam follower restricting means may take widely different configurations, provided that the rotation restricting portion is so constructed as to permit the cam follower 6 to restrict the rotation of the screw body 5 and the nut body 7 about the rotation axis, that the rotation restriction releasing portion is so constructed as to release the restriction which prevents the cam follower 6 from rotating about the rotation axis so that the cam follower 6 can rotate about the rotation axis at a very small rate with respect to the turn of screw body 5, and that the rotation restriction releasing portion is so constructed as to permit the cam follower 6 to move in a direction in parallel with the rotation axis. The invention includes optical devices incorporating a focusing unit according to the invention, and such optical devices may include, in addition to binoculars as depicted in FIGS. 1 and 2, telescopes, field scopes, telephotographic units mounted on cameras, among others.

Figure 4:
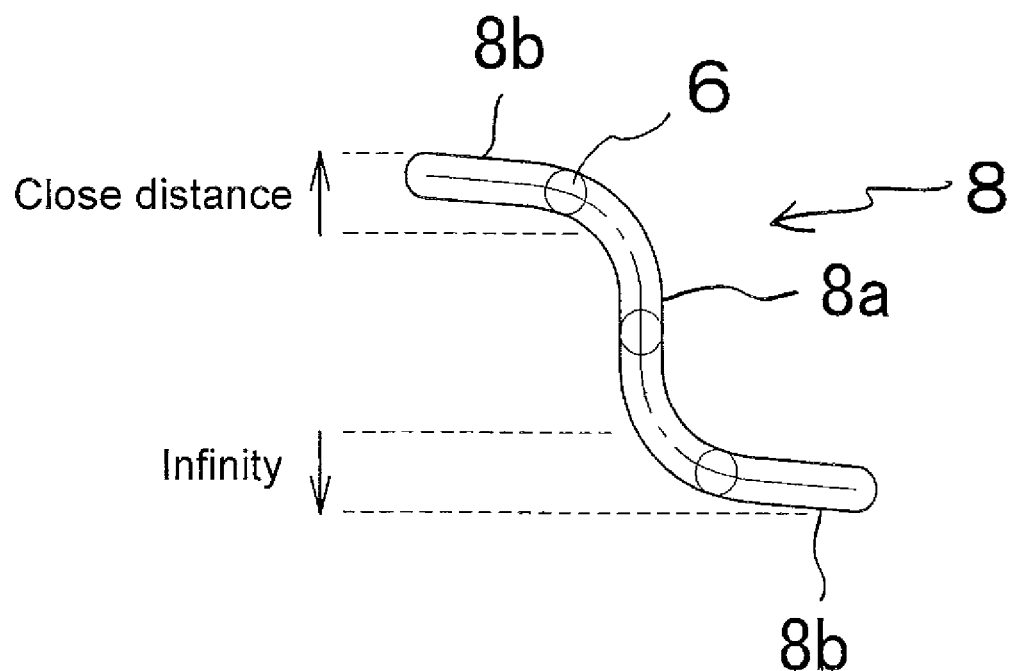
FIG. 4 is an illustration showing another embodiment of the cam follower restricting means of the invention.

With a cam follower restricting means comprising a long opening 8a and a second long opening 8b as shown in FIG. 3, when one end of the long opening 8a opposite to second long opening 8b is located on the eyepiece lens side, it is possible to finely adjust the focus at infinity by moving the cam follower 6 along the second long opening 8b. On the other hand, when the second long opening 8b is on the eyepiece lens side, it is possible to finely adjust the focus at a close distance by moving the cam follower 6 along the second long opening 8b. Furthermore, with a cam follower restricting means as shown in FIG. 4, it is possible to finely adjust the focus at a close distance as well as at infinity, which allows rapid adjustment of the focus at a close distance as well as at infinity.

Figure 5:
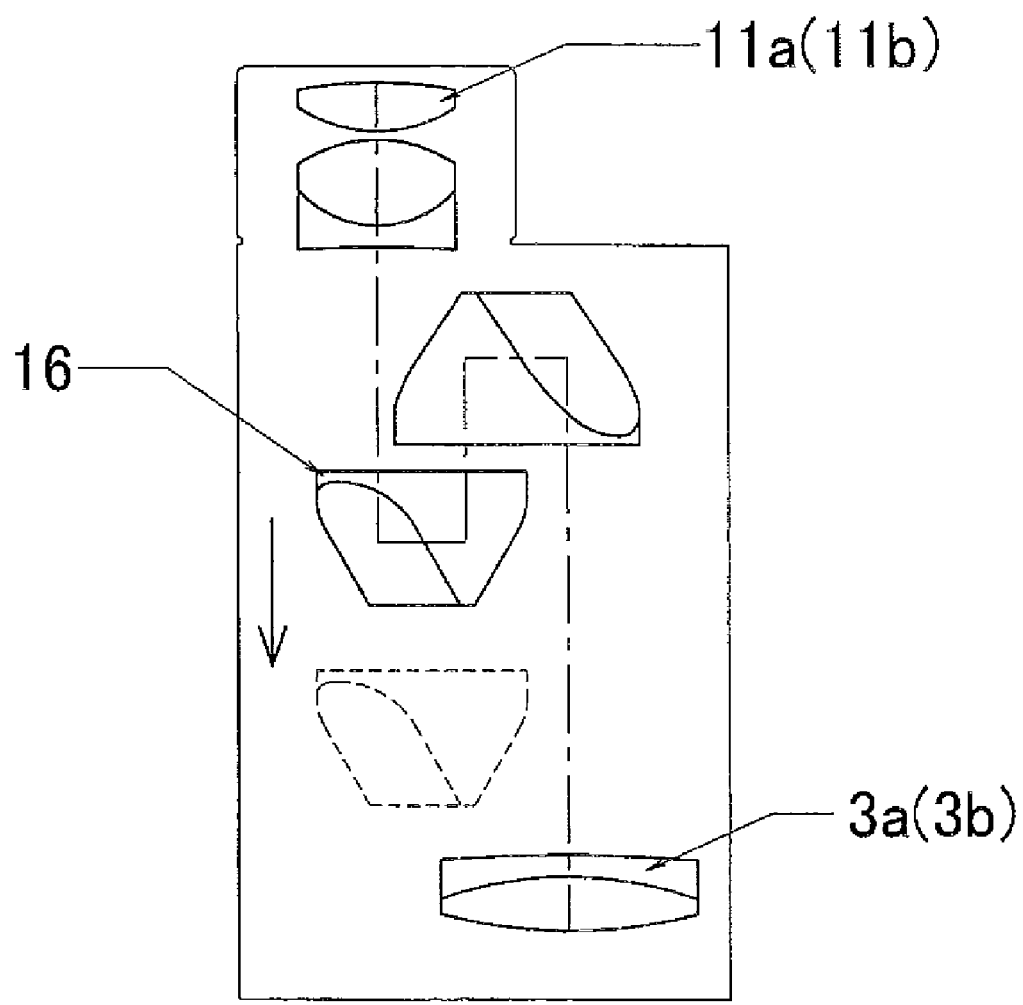
FIG. 5 is an illustration showing an optical system where a prism is moved in accordance with the invention.

According to the invention, the movable optical member includes an objective lens, eyepiece lens, and prism inserted between an objective lens and eyepiece lens. For example, as shown in FIG. 5, a rod body 9a (9b) may be used for moving a prism 16 along an optical axis.

Embodiments of the invention have been described above, but the present invention is not limited to the above embodiments. The invention is to be construed in accordance with the appended claims and reasonable requirements thereof.

What is claimed is:

1. A focusing unit comprising:
    a screw body having a male thread in an outer perimeter face thereof;
    a tubular nut body having an inner perimeter face and an outer perimeter face with a female thread in the inner perimeter face to engage with the screw body, and having a cam follower on the outer perimeter face;
    a cam ring holding the screw body rotatably and axially non-movable relative to the cam ring, receiving said tubular nut body inside the cam ring slidably, and comprising a perimeter wall, wherein the cam ring has a groove for receiving said cam follower, formed in the perimeter wall, comprising a first long groove axially parallel with the tubular nut body, having a first axial direction end and a second axial direction end, and a second long groove having a first inclined end and a second inclined end, wherein the first inclined end is connected to the second axial direction end so that an angle between the first long groove is more than a right angle and the cam follower is able to follow the first long groove and the second long groove smoothly; and
    an optical member driver fixedly connected to the tubular nut body, axially movable by translating rotation of the screw body via the tubular nut body to movement in the axial direction, said optical member driver further connected to an optical member.

2. The focusing unit according to claim 1 wherein the optical member is an objective lens, an eyepiece lens, or a prism arranged on an optical axis between the objective lens and eyepiece lens.

3. The focusing unit according to claim 1 wherein the cam follower is a pin projecting radially outward from the outer perimeter face of said tubular nut body.

4. The focusing unit according to claim 1, wherein the optical member driver comprises a rod body having a first rod end and a second rod end, and a holding member for holding the optical member, wherein the first rod end is secured to the tubular nut body and the second rod end is secured to the holding member.

5. An optical device comprising a focusing unit as described in claim 1.

6. The focusing unit according to claim 2, wherein the optical member driver comprises a rod body having a first rod end and a second rod end, and a holding member for holding the optical member, wherein the first rod end is secured to the tubular nut body and the second rod end is secured to the holding member.

7. The focusing unit according to claim 3, wherein the optical member driver comprises a rod body having a first rod end and a second rod end, and a holding member for holding the optical member, wherein the first rod end is secured to the tubular nut body and the second rod end is secured to the holding member.

8. An optical device comprising a focusing unit as described in claim 2.

9. An optical device comprising a focusing unit as described in claim 3.

10. An optical device comprising a focusing unit as described in claim 4.

11. An optical device comprising a focusing unit as described in claim 6.

12. An optical device comprising a focusing unit as described in claim 7.

13. The focusing unit according to claim 1, the groove further comprising a third long groove having a third inclined end and a fourth inclined end, wherein the fourth inclined end is connected to the first axial direction end so that a second angle between the first long groove and the third long groove is more than a right angle and the cam follower is able to follow the third long groove, the first long groove, and the second long groove smoothly.

14. The focusing unit according to claim 7, the groove further comprising a third long groove having a third inclined end and a fourth inclined end, wherein the fourth inclined end is connected to the first axial direction end so that a second angle between the first long groove and the third long groove is more than a right angle and the cam follower is able to follow the third long groove, the first long groove, and the second long groove smoothly.

15. The focusing unit according to claim 1, wherein the difference between the angle and a right angle is from 3 to 45°.

16. The focusing unit according to claim 7, wherein the difference between the angle and a right angle is from 3 to 45°.

17. The focusing unit according to claim 4, further comprising an operation member:
wherein the screw body has a cylindrical shape having a first cylinder end, a second cylinder end, and a body portion with an annular face in which the male thread is formed, and the operation member for rotation is secured to the first cylinder end; and
the cam ring further comprises:
a bottom end fixed to the perimeter wall, the bottom end having a hole through which the rod body runs; and
a joining pin projecting from the bottom end and extending in a direction opposite the bottom end, which joining pin is inserted into the screw body from the second cylinder end, thereby fixing the screw body to the cam ring rotatably but axially non-movably.

18. The focusing unit according to claim 7, further comprising an operation member:
wherein the screw body has a cylindrical shape having a first cylinder end, a second cylinder end, and a body portion with a cylindrical face in which the male thread is formed, and the operation member for rotation is secured to the first cylinder end; and
the cam ring further comprises:
a bottom end fixed to the perimeter wall, the bottom end having a hole through which the rod body runs; and
a joining pin projecting from the bottom end and extending in a direction opposite the bottom end, which joining pin is inserted into the screw body from the second cylinder end, thereby fixing the screw body to the cam ring rotatably but axially non-movably.

19. The focusing unit according to claim 16, further comprising an operation member:
wherein the screw body has a cylindrical shape having a first cylinder end, a second cylinder end, and a body portion with a cylindrical face in which the male thread is formed, and the operation member for rotation is secured to the first cylinder end; and
the cam ring further comprises:
a bottom end fixed to the perimeter wall, the bottom end having a hole through which the rod body runs; and
a joining pin projecting from the bottom end and extending in a direction opposite the bottom end, which joining pin is inserted into the screw body from the second cylinder end, thereby fixing the screw body to the cam ring rotatably but axially non-movably.

* * * * *